Patented June 8, 1943

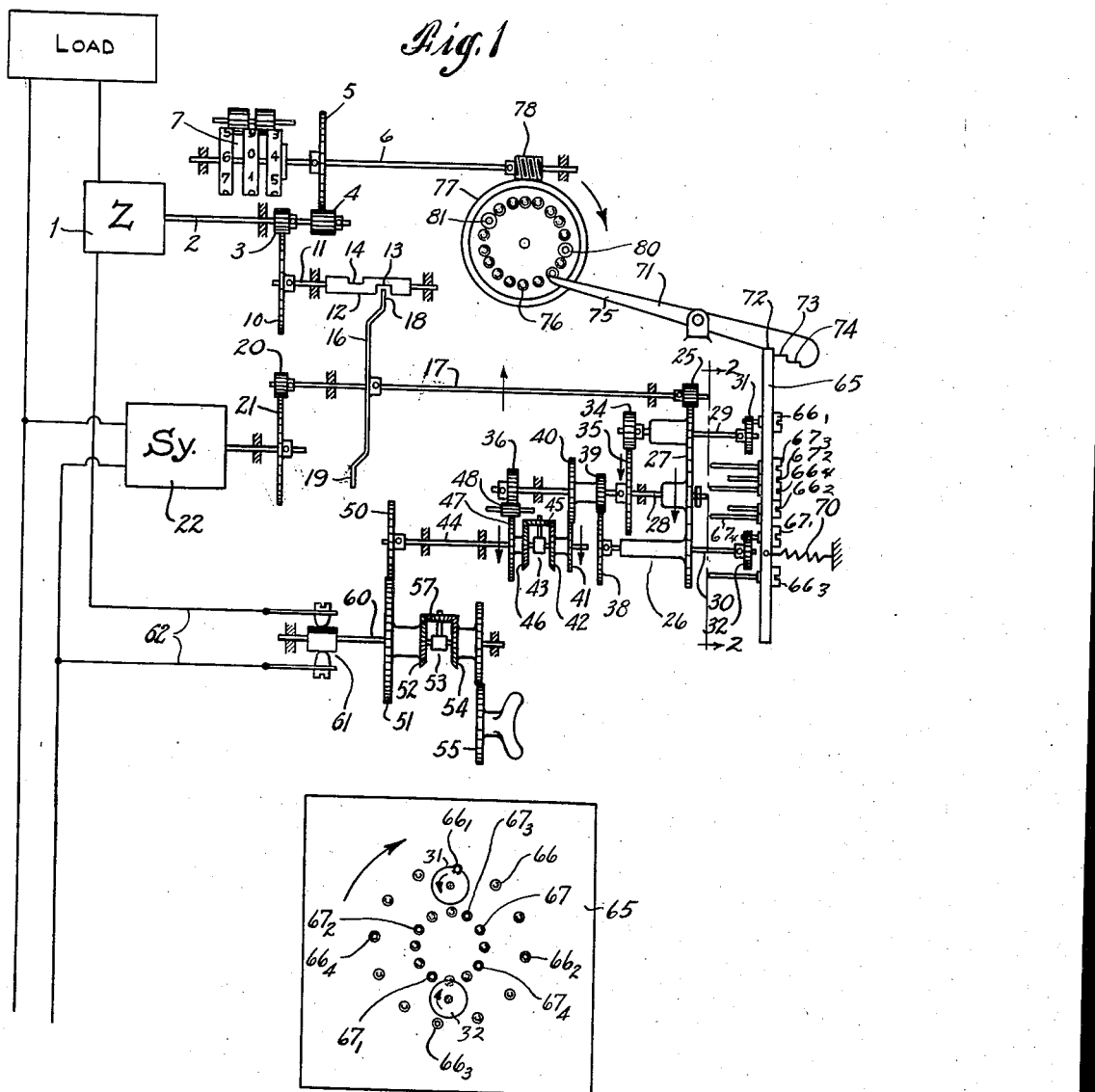

2,321,419

UNITED STATES PATENT OFFICE 2,321,419

ELECTRICITY METER

Richard Pudelko, Zug, Switzerland, assignor to Landis & Gyr, A.-G., Zug, Switzerland, a body corporate of Switzerland Application February 17, 1940, Serial No. 319,397
In Switzerland February 20, 1939

5 Claims. (Cl. 171—268)

This invention relates to multi-tariff meters and more particularly to electric meters having a plurality of tariffs adapted to cooperate with a prepayment system.

Meters having a plurality of rates or tariffs depending upon the consumption of the energy or medium being metered are old and, in general, contemplate gear shifting or switching, all driven by the meter. Such a device is rather complicated and becomes more so when associated with a prepayment system. Where the mechanism is driven by the meter, considerable difficulty has been experienced not only in maintaining the accuracy of the meter at a uniformly high level but also in the design of the auxiliary apparatus. It is desirable that the auxiliary apparatus controlling the tariff or rate be readily adjustable and have substantial mass and strength to last a long time. Such requirements, as a rule, transcend the limits imposed upon such auxiliary apparatus by virtue of being meter driven and constitute serious design limitations and operating drawbacks. By the invention disclosed, greater flexibility in design is permitted since the meter itself has little extra load imposed on it by virtue of the variable rate apparatus so that the meter accuracy and life remain substantially unimpaired. The motive power for such auxiliary apparatus is supplied by any type of mechanism or motor to a suitable gearing system.

The meter itself exercises a supervisory control over the supply of power to said gearing system and permits a power flow at intervals corresponding to predetermined quanta of consumed commodity or energy as the case may be. In the invention as disclosed, the meter control is of a general detent action with torque being applied continuously by the power source. Where electricity is the commodity being consumed, an electric motor, continuously energized but being able to remain stalled without harm may conveniently be utilized. For alternating current systems, a synchronous type motor is highly satisfactory.

The gearing system has one basic gear ratio corresponding to a basic tariff. However, a plurality of gear ratios may be obtained by means under the control of the meter and acting after predetermined quanta of commodity have been consumed.

The variable ratio gearing system may be applied to any suitable mechanism for indicating the amount of consumed energy or condition of the consuming system. In connection with a prepayment system, the commodity may be fully cut-in or cut-off by suitable means. This means preferably has a definite range between these two positions but it is understood that as far as the commodity itself is concerned there are no intermediate positions. Manual means with a coin control may be provided for putting the control means in a full cut-in position. The power source and gearing system tend to run the control means over to the cut-off position. Thus for the same range of control means operation, a variable gear ratio in the system tends to vary the tariff rate.

The gear radio of the system may be readily varied by manual means to change the variation in tariffs. In general, the power drive of the gearing is delivered to two sun and planet gear assemblies in parallel relationship to the flow of power. The power through these assemblies is recombined additively in a differential. By modifying the normal relative motions of the gears in one or both assemblies, a smooth variable ratio gearing system results.

By virtue of this arrangement the limitations on the size and character of the gear trains in the multi-rate portion of the system are completely eliminated. Hence, a simple, strong and efficient system may be provided for varying the rates.

In general, the meter system is provided with a detent or stop acting upon the motor drive, this detent or stop releasing the motor drive at predetermined intervals with relation to the meter. The motor drive as thus controlled by the meter is provided with a suitable gear train having the two sun and planet assemblies as previously described and having a pair of free gears each of which is rigidly coupled to one of the two gears in each sun and planet assembly.

A plate carries a plurality of pins of different length for cooperation with one or both free gears and the plate itself may be fixed in any one of a number of positions, to take advantage of the different pin lengths. A change in the plate position results in a change in the number of pins effectively cooperating with the free gears. By means of a differential arrangement, the cooperation of the rotating gears and different sized pins is either additively or subtractively imposed upon the normal drive.

Referring to the drawing;

Figure 1 is a diagrammatic showing of the invention; and

Fig. 2 is a sectional view taken on the line 2—2 of Figure 1.

A commodity consumption meter 1 has a drive shaft 2 upon which are disposed spur gears 3 and 4. Spur gear 4 meshes with a gear 5 carried by a shaft 6, one end of which drives an integrating system generally designated by 7. It is understood that the shafts are suitably journalled and no specific description of the shaft mountings will therefore be made.

Spur gear 3 meshes with a gear 10 mounted on a stub shaft 11 and carrying a detent control member 12. Member 12 may be a cylindrical rod having a pair of slots 13 and 14 disposed lengthwise of member 12 and rotatively staggered 180°.

Detent control member 12 cooperates with a rod 16 mounted at the center thereof on a power drive shaft 17. Rod 16 has its ends 18 and 19 bent in opposite directions from the length of the rod proper so that parts 18 and 19 may pass through slots 13 and 14 respectively when the cooperating rod end and slot are in proper rotative relation. Rod 16 and detent 12 thus control drive shaft 17 which normally has a continuous torque applied thereto by gears 20 and 21, and motor 22. In the event that the commodity is alternating current of electricity this motor 22 may be of the synchronous type so geared that rod 16 tends to turn faster than any normal rotation of member 12. Otherwise any means for applying a continuous torque may be utilized.

Drive shaft 17 carries a spur gear 25 which furnishes the motive power of a system of gears generally designated as variable gear system 26. This system comprises a large gear 27 which meshes with spur gear 25. Rotatively journalled in gear 27 are a pair of stub shafts 29 and 30 symmetrical with respect to shaft 28 upon which gear 27 is loosely mounted. Shafts 29 and 30 thus rotate with gear 27 and these shafts project equal distances from the right of gear 27 as seen in Fig. 1. At what may be termed the front ends of shafts 29 and 30 are rigidly mounted small gears 31 and 32 of which more will be said later.

Shaft 29 carries, at its rear end, a planet gear 34 which meshes with a sun gear 35 rotatively fixed to shaft 28, the latter rotating a gear 36 fixed to the end of shaft 28. Thus gears 34, 35 and 36 form a sun and planet driving unit.

Shaft 30 carries, at its rear end, a planet 38 which meshes with a sun gear 39 rotatively fixed to gear 40. Gears 39 and 40 are loose on shaft 28. Gear 40 meshes with a gear 41 having as a mate, a bevel gear 42 which latter gear is part of a differential 43. Bevel gear 42, which is loose on differential shaft 44, meshes with sun gear 45 supported in the usual fashion to turn shaft 44. Gear 45 also meshes with the other differential bevel gear 46, loose on shaft 44 and rigidly joined to gear 47 which is driven through an intermediate spur gear 48 by gear 36.

The differential shaft 44 carries at its end a gear 50, rigidly coupled thereto, which gear drives a gear 51. This gear 51 is joined to gear 52 forming part of a prepayment differential 53. The other differential gear 54 is under the control of a coin-controlled winding mechanism generally designated as 55. The prepayment differential idler 57 drives prepayment shaft 60 which controls a supply switch 61 in a power circuit 62 connected through meter 1. Motor 22 is connected to the supply mains so as not to be affected by the position of switch 61. It is understood that prepayment shaft 60 has a predetermined permissible rotary movement, representing the range between a switched out position and a coin or other controlled switched-in position.

It is evident that the relative rotation of differential gears 42 and 46 will determine the permissible consumption of energy corresponding to the range of movement of prepayment shaft 60. This shaft 60 has a constant range but this range may be translated into variable meter quantities, dependent upon the turning of differential shaft 44. This differential shaft movement is the arithmetical sum (or difference) of the movements of differential gears 42 and 46. This can be translated to a difference (or sum) of the movements of gears 32 and 31 respectively. Hence, anything affecting the turning rate of these two gears will affect the tariff-rate of the entire system.

Disposed adjacent gears 32 and 31 is a disc or plate 65 having two series of tapped apertures 66 and 67. These apertures are on the circumferences of the two concentric circles to which the pitch circles of gears 31 and 32 are tangent. The number and spacing of the apertures may be varied within wide limits consistent with the pitch of the teeth of gears 31 and 32. At predetermined apertures, pins may be mounted. Thus, as one example, pins $66_1$ to $66_4$ inclusive may be disposed as shown. Thus pin $66_1$ may have a short length, $66_2$ may have a longer length, while pins $66_3$ and $66_4$ have a still longer length. Pins $67_1$ to $67_4$ inclusive may be disposed in the inner series of apertures 67. These pins may come in three lengths also, with $67_1$ being the shortest, $67_2$ intermediate and $67_3$ and $67_4$ being the longest.

In the position of disc 65 as shown, every pin in the two series of apertures will affect gears 31 and 32 respectively. Each pin will act as a meshing gear tooth and tend to turn the gears in the directions shown by the curved arrows on the gears (Fig. 2). Thus the number of pins cooperating with gears 31 and 32 will determine the price rate or tariff of the system. In addition to being manually adjustable by the number of pins in apertures, a three range system under the control of the meter is provided. This number is merely exemplary and may be greater or smaller, as occasion demands.

To provide the meter-controlled ranges, disc 65 is transversely movable and normally biased by a spring 70 to an outward movement, considering disc 65 as the front face of the system. The outward movement of disc 65 is controlled by a pivoted dog 71 having, at one end, three steps 72, 73 and 74, each of which may successively engage the edge of disc 65 and retain it in position. The end 75 of lever 71 overlies a series of apertures 76 in a disc 77 driven by a worm 78 on shaft 6. A pair of pins 80 and 81 of different diameters may be disposed in two of the apertures. The pins 80 and 81 are so proportioned that lever 71 will be moved to permit steps 73 and 74 respectively to engage disc 65. Normally the stepped end of lever 71 is so heavy as to bias it in a locking position. It is understood that the reset of disc 65 to the position shown on step 72 must be by an operator. In each position of the disc, the number of gear actuating pins in apertures 66 and 67 naturally depends upon the length thereof. Thus in the intermediate disc position on step 73, the intermediate and long pins will cooperate with gears 31 and 32 while in the outermost disc position 74, only the long pins will function.

It is clear that either gear 31 or 32 may be eliminated and with it may be eliminated the corresponding sun and planet gear coupling. In such case, differential 43 will be unnecessary and may be eliminated. However, a greater variety of gear ratio variations is possible. Furthermore, by having say a ten to one speed ratio between gears 38 and 34, the differential functions as an adding machine so that the final motion at the coin control has a readily calculable significance.

Thus the entire auxiliary system between the motor and coin control has several places where the tariff rate may be controlled. Thus detent 12 or member 16 may be varied. The detent may have more or less slots and member 16 may have more or less arms. Pins or buttons 80 and 81 may be changed in number and position, the number requiring a corresponding change in the number of steps of lever 71. These changes may be termed factory changes which may be made with little trouble and time. The changes with pins on disc 55 may be made in the field and may be considered as customer changes.

The operation of the illustrative embodiment may be summarized as follows:

The knob 55 is turned manually and revolves the planet gear 57 to turn shaft 60, closing the main switch 61, thereby supplying current to the load through the meter Z.

As electrical energy is consumed meter Z rotates the shaft 2, slowly turning the slotted member 12 by means of gears 3 and 10, thereby allowing intermittent movement of the shaft 17 under the torque of the synchronous motor 22 and under control of the escapement members 12, 13, 14, 16, 18 and 19. Rotation of the shaft 17 drives the disclike gear 27 and causes gears 34 and 38 to have free planetary revolution around their sun gears 35 and 39. During the rotation of the gear 27, the eccentrically carried gear 31 contacts with the various pins $66_1$, $66_2$, $66_3$, $66_4$, and gear 32 contacts with pins $67_1$, $67_2$, $67_3$, $67_4$, so that the gears 31 and 32 are intermittently revolved in accordance with the number of pins engaged by them. The revolution of gear 31 interferes with the free planetary action of gear 34 and causes gear 35 to be advanced, while the similar action of gear 32 causes gear 39 to be moved in the reverse direction. Gear 39 is fixed to gear 40, meshing with gear 41 fixed to sun gear 42, while gear 35 is fixed to gear 36, driving gear 47 through the reversing idler 48, thereby rotating sun gear 46. The movements of gears 42 and 46 are added and the planetary gear 45 revolves, carrying gear 50 with it, and this rotation of gear 50 causes a movement of the planetary gear 57 opposite to that imparted to it by the manually actuated knob 55, thereby tending to open the switch 61.

After a predetermined amount of energy has been consumed, plate 65 is moved to the right by spring 70. For this purpose the meter shaft 2 also drives shaft 6 which is carried by reduction gearing to rotate the pin carrying disc 77, as well as to actuate the totalizing register 7. As disc 77 rotates, pin 80 engages the left end 75 of lever 71 and notch 72 is raised sufficiently to allow the movement of plate 65 to the right into engagement with notch 73. Thereby, on further consumption of energy and revolution of gears 31 and 32, a lesser number of pins are engaged, illustratively pins $66_2$ and $67_2$. Further consumption of energy repeats the operation so as to allow further movement of plate 65 to the right and thereby only pins $66_3$, $66_4$, $67_3$ and $67_4$ are permitted to actuate the gears 31 and 32.

If the amount of energy consumed equals that corresponding to the movement of the knob 55, and switch 61 has been opened, the switch 61 can be reset by again actuating the knob 55.

At the end of the metering period, for example, one month, the plate 65 is moved to the left so that it is held in the position shown by notch 72, and energy is supplied at the maximum rate until pin 80 has released the plate 65 to its secondary position.

It is clear that a rugged, reliable, highly flexible tariff changing system may be used in conjunction with precision meters without in any manner compromising the operation of the meter.

What is claimed is:

1. A multi-tariff metering system for an electric power supply circuit comprising an integrating type meter for measuring the power consumed, a main switch for controlling the supply of power to said meter and having a cut-in and cut-out position, means for controlling said main switch, said controlling means having a predetermined operating range between switch cut-out and switch cut-in positions corresponding to a predetermined base tariff for said power, manual means for setting said controlling means to a switch cut-in position, an electric motor and gearing system connected to said controlling means tending to drive said controlling means to a switch cut-out position, said gearing system including at least one sun and one planet gear, a driving gear rigidly coupled to one of said two gears, a disk having a plurality of pins of different lengths disposed adjacent said driving gear, said driving gear being adapted normally to engage certain of said pins to have its motion modified, means interconnecting said meter and said gearing system for controlling the flow of power through said gearing system in accordance with the metered power consumed, means tending to bias said disk to a predetermined position where a predetermined number of said pins tend to cooperate with said driving gear, means for locking said disk to a position different from the biased position, and means controlled by said meter for releasing said locking means to permit said disk to respond to its bias and assume a new position whereby the number of pins affecting said driving gear may be varied in accordance with the metered power consumed.

2. The system of claim 1 wherein said means for changing the position of said disk includes a lever having a series of steps each of which is adapted to hold said disk in a predetermined position.

3. A multi-tariff metering system for an electric power supply circuit comprising an integrating type meter for measuring the power consumed, a main switch for controlling the supply of power to said meter and having a cut-in and cut-out position, means for controlling said main switch, said controlling means having a predetermined operating range between a switch cut-out and switch cut-in positions corresponding to a predetermined base-tariff for said power, manual means for setting said controlling means to a switch cut-in position, a synchronous electric motor and gearing system connected to said controlling means tending to drive said controlling means to a switch cut-out position, means interconnecting said meter and said gearing system for controlling the flow of power through said gearing system in accordance with the metered power consumed and including a detent operated by said meter for stalling said motor at intervals corresponding to a predetermined consumption of power, said gearing system having a predetermined gear ratio corresponding to a predetermined tariff rate, and means controlled by the meter for changing said gear ratio to a different gear ratio to alter the tariff rate after a predetermined consumption of power as determined by the meter.

4. The structure of claim 3, wherein said gearing system includes a differential gearing having sun and planet gears; and wherein the means controlled by the meter for changing said gear ratio includes a disc having a plurality of groups of pins carried thereby, a gear drivingly connected to the differential and movable relative to and adapted to be driven by said pins, and further includes means operatively connecting the meter to said pin carrying disc, for changing the position of said disc to bring another group of pins into operation.

5. The structure of claim 3, wherein said gearing system includes a differential gearing having sun and planet gears; and wherein the means controlled by the meter for changing said gear ratio includes a disc having a plurality of groups of pins carried thereby, and includes a plurality of gears drivingly connected to the differential to have their movement totalized thereby and movable relative to and adapted to be driven by the pins, and further includes means controlled by the meter for moving said disc to place certain groups of pins out of driving relation with respect to said gears movable relative thereto.

RICHARD PUDELKO.